(12) United States Patent  
Carlson

(10) Patent No.: US 7,854,385 B2
(45) Date of Patent: Dec. 21, 2010

(54) AUTOMATIC REGION OF INTEREST FOCUSING FOR AN IMAGING-BASED BAR CODE READER

(75) Inventor: Bradley S. Carlson, Huntington, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 21 days.

(21) Appl. No.: 11/931,410

(22) Filed: Oct. 31, 2007

(65) Prior Publication Data

US 2009/0108071 A1   Apr. 30, 2009

(51) Int. Cl.
*G06K 7/10* (2006.01)

(52) U.S. Cl. .............. 235/462.41; 235/462.23; 235/462.24

(58) Field of Classification Search ............. 235/462.22
See application file for complete search history.

(56) References Cited

U.S. PATENT DOCUMENTS

| 5,302,812 | A | * | 4/1994 | Li et al. ................. 235/462.22 |
| 6,088,482 | A | | 7/2000 | He et al. |
| 6,176,428 | B1 | | 1/2001 | Joseph et al. |
| 6,250,551 | B1 | | 6/2001 | He et al. |
| 6,340,114 | B1 | | 1/2002 | Correa et al. |
| 6,340,119 | B2 | | 1/2002 | He et al. |
| 6,405,925 | B2 | | 6/2002 | He et al. |
| 6,634,558 | B1 | | 10/2003 | Patel et al. |
| 6,732,929 | B2 | * | 5/2004 | Good et al. ............. 235/462.01 |
| 6,860,428 | B1 | * | 3/2005 | Dowling et al. ........ 235/462.45 |
| 2006/0118635 | A1 | * | 6/2006 | Joseph et al. .......... 235/462.24 |

* cited by examiner

*Primary Examiner*—Seung H Lee
*Assistant Examiner*—Christopher Stanford

(57) ABSTRACT

A variable focus imaging lens assembly for an imaging system of an imaging-based bar code reader for imaging and decoding a target bar code. The lens assembly includes an automatic focusing system for energizing a drive mechanism and imaging system to move a movable lens from the predetermined position along its path of travel and generate a series of image frames; analyzing one or more image frames of the series of image frames to determine a region of interest, the region of interest including an image of a target bar code; analyzing the region of interest in subsequent image frames of the series of image frames to determine an amount of blurring; selecting an image frame from the series of image frames having blurring less than a threshold amount of blurring; and utilizing a decoder to decode the image of the target bar code in the selected image frame.

20 Claims, 8 Drawing Sheets

AUTOMATIC REGION OF INTEREST FOCUSING FOR AN IMAGING-BASED BAR CODE READER

FIELD OF THE INVENTION

The present invention relates to a variable focus imaging lens assembly for an imaging-based bar code reader and, more particularly, to a variable focus imaging lens assembly for an imaging-based bar code reader providing for automatic region of interest focusing for a variable focus lens of the imaging lens assembly corresponding to a reference focal plane.

BACKGROUND ART

Various electro-optical systems have been developed for reading optical indicia, such as bar codes. A bar code is a coded pattern of graphical indicia comprised of a series of bars and spaces of varying widths, the bars and spaces having differing light reflecting characteristics. Some of the more popular bar code symbologies include: Universal Product Code (UPC), typically used in retail stores sales; Data Matrix, typically used for labeling small electronic products; Code 39, primarily used in inventory tracking; and Postnet, which is used for encoding zip codes for U.S. mail. Bar codes may be one dimensional (1D), i.e., a single row of graphical indicia such as a UPC bar code or two dimensional (2D), i.e., multiple rows of graphical indicia comprising a single bar code, such as Data Matrix which comprising multiple rows and columns of black and white square modules arranged in a square or rectangular pattern.

Systems that read bar codes (bar code readers) electro-optically transform the graphic indicia into electrical signals, which are decoded into alphanumerical characters that are intended to be descriptive of the article or some characteristic thereof. The characters are then typically represented in digital form and utilized as an input to a data processing system for various end-user applications such as point-of-sale processing, inventory control and the like.

Bar code readers that read and decode bar codes employing imaging systems are typically referred to as imaging-based bar code readers or bar code scanners. Imaging systems include charge coupled device (CCD) arrays, complementary metal oxide semiconductor (CMOS) arrays, or other imaging sensor arrays having a plurality of photosensitive elements (photosensors) defining image pixels. An illumination apparatus or system comprising light emitting diodes (LEDs) or other light source directs illumination toward a target object, e.g., a target bar code. Light reflected from the target bar code is focused through a system of one or more lens of the imaging system onto the sensor array. Thus, the target bar code within a field of view (FV) of the imaging lens system is focused on the sensor array.

Periodically, the pixels of the sensor array are sequentially read out generating an analog signal representative of a captured image frame. The analog signal is amplified by a gain factor and the amplified analog signal is digitized by an analog-to-digital converter. Decoding circuitry of the imaging system processes the digitized signals representative of the captured image frame and attempts to decode the imaged bar code.

As mentioned above, imaging-based bar code readers typically employ an imaging lens assembly for focusing scattered/reflected light from the field of view (FV) onto the sensor array. If a target object is within the field of view FV, an image of the target object will be focused onto the sensor array.

There are typically two types of imaging lens assemblies: 1) fixed focus lens systems; and 2) variable focus lens systems. In a fixed focus system, the field of view (FV) and a working range (WR) of the imaging system is fixed. The working range (WR) of an imaging system is a distance range in front of or forward of the imaging lens assembly within which a target object of interest, such as a target bar code, may be successfully imaged and decoded by the imaging system decoding circuitry.

The working range (WR) and field of view (FV) require a user to move the bar code reader relative to the target bar code such that the target bar code is within the field of view (FV) and within the working range (WR) of the imaging system for successful decoding of the imaged target bar code. At the near and far limits of the working range (WR), there is a problem with blurriness, that is, poor resolution of the imaged target bar code. A variable focus lens system addresses the blurriness problem at the limits of the working range (WR) by providing for readjustment/refocusing of the lens system. This readjustment/refocusing of the lens system facilitates obtaining an in-focus image of a target bar code focused onto the sensor array, thus, mitigating blurriness at the limits of the working range (WR).

Known mechanical variable focus lens assemblies depend on mechanical movement of one lens (or more lenses depending on the assembly) of lens assembly with respect to a stationary sensor array. Typically, an automatic focusing system controls movement of the lens of the variable focus lens assembly. Obviously as the lens moves, a sharpness of an image of a target object, such as a target bar code, focused on the sensor array changes with the position of the lens. In order to select the proper image focus, the automatic focusing system may analyze image quality, for example, in terms of the amount of blur in the captured image (hereafter "blur analysis"). Generally, automatic focusing systems select the lens position with the least blur for image capture and attempted decoding of the imaged target bar code.

However, within the field of view (FV), there are objects at different depths or distances from the lens assembly, thus, different regions of the image will have differing degrees of blurriness. In conventional consumer camera systems, a central portion of the image is utilized for blur analysis. While this approach may be appropriate for consumer camera systems, it is not effective for bar code imaging. In bar code imaging, it is desirable that the portion of the image used for blur analysis includes the bar code.

What is needed is a method and apparatus for automatically selecting a region of interest of a captured image for blur analysis that includes an image of the bar code.

SUMMARY

In one aspect, the present invention features a variable focus imaging lens assembly for an imaging system of an imaging-based bar code reader for imaging and decoding a target bar code, the imaging system generating image frames of a field of view of the imaging system and including an imaging sensor array and a decoder for decoding an image of the target bar code. In one exemplary embodiment, the variable focus imaging lens assembly includes:

a lens assembly focusing light from the field of view onto the sensor array, the lens assembly including a lens movable along a path of travel;

a drive mechanism driving the movable lens from a predetermined position along the path of travel;

an automatic focusing system:

energizing the drive mechanism and imaging system to move the movable lens from the predetermined position along its path of travel and generate a series of image frames;

analyzing an image frame of the series of image frames to determine a region of interest, the region of interest including an image of a target bar code;

analyzing the region of interest in subsequent image frames the series of image frames to determine an amount of blurring in each image frame;

selecting an image frame from the subsequent image frames of the series of image frames having an amount of blurring less than a threshold amount; and utilizing the decoder to decode the image of the target bar code in the selected image frame.

In one embodiment, the movable lens path of travel is coincident with the optical axis of the lens assembly. In an exemplary embodiment, the predetermined position of the movable lens corresponds to a far working range of the imaging system. In one embodiment, the movable lens is moved along a path of travel corresponding to moving from a far working range to a near working range of the imaging system. In an exemplary embodiment, determination of the region of interest includes contrast and edge detection analysis.

In one aspect, the present invention features an imaging-based bar code reader for imaging and decoding a target bar code. In one exemplary embodiment, the bar code reader includes:

an imaging system generating image frames of a field of view of the imaging system and including an imaging sensor array and a decoder; and a variable focus imaging lens assembly for focusing light from the field of view onto the sensor array, the variable focus imaging lens assembly including:

a lens assembly focusing light from the field of view onto the sensor array, the lens assembly including a lens movable along a path of travel;

a drive mechanism driving the movable lens along the path of travel;

an automatic focusing system:

energizing the drive mechanism and imaging system to move the movable lens from the predetermined position along its path of travel and generate a series of image frames;

analyzing an image frame of the series of image frames to determine a region of interest, the region of interest including an image of a target bar code;

analyzing the region of interest in subsequent image frames of the series of image frames to determine an amount of blurring in each frame;

selecting an image frame from the subsequent image frames of the series of image frames having an amount of blurring less than a predetermined threshold; and utilizing the decoder to decode the image of the target bar code in the selected image frame.

In one embodiment, the movable lens path of travel is coincident with the optical axis of the lens assembly. In an exemplary embodiment, the predetermined position of the movable lens corresponds to a far working range of the imaging system. In one embodiment, the movable lens is moved along a path of travel corresponding to moving from a far working range to a near working range of the imaging system. In an exemplary embodiment, determination of the region of interest includes contrast and edge detection analysis.

These and other objects, advantages, and features of the exemplary embodiments are described in detail in conjunction with the accompanying drawings.

BRIEF DESCRIPTION OF THE DRAWINGS

The foregoing and other features and advantages of the present invention will become apparent to one skilled in the art to which the present invention relates upon consideration of the following description of the invention with reference to the accompanying drawings, in which.

DETAILED DESCRIPTION

Figure 1:
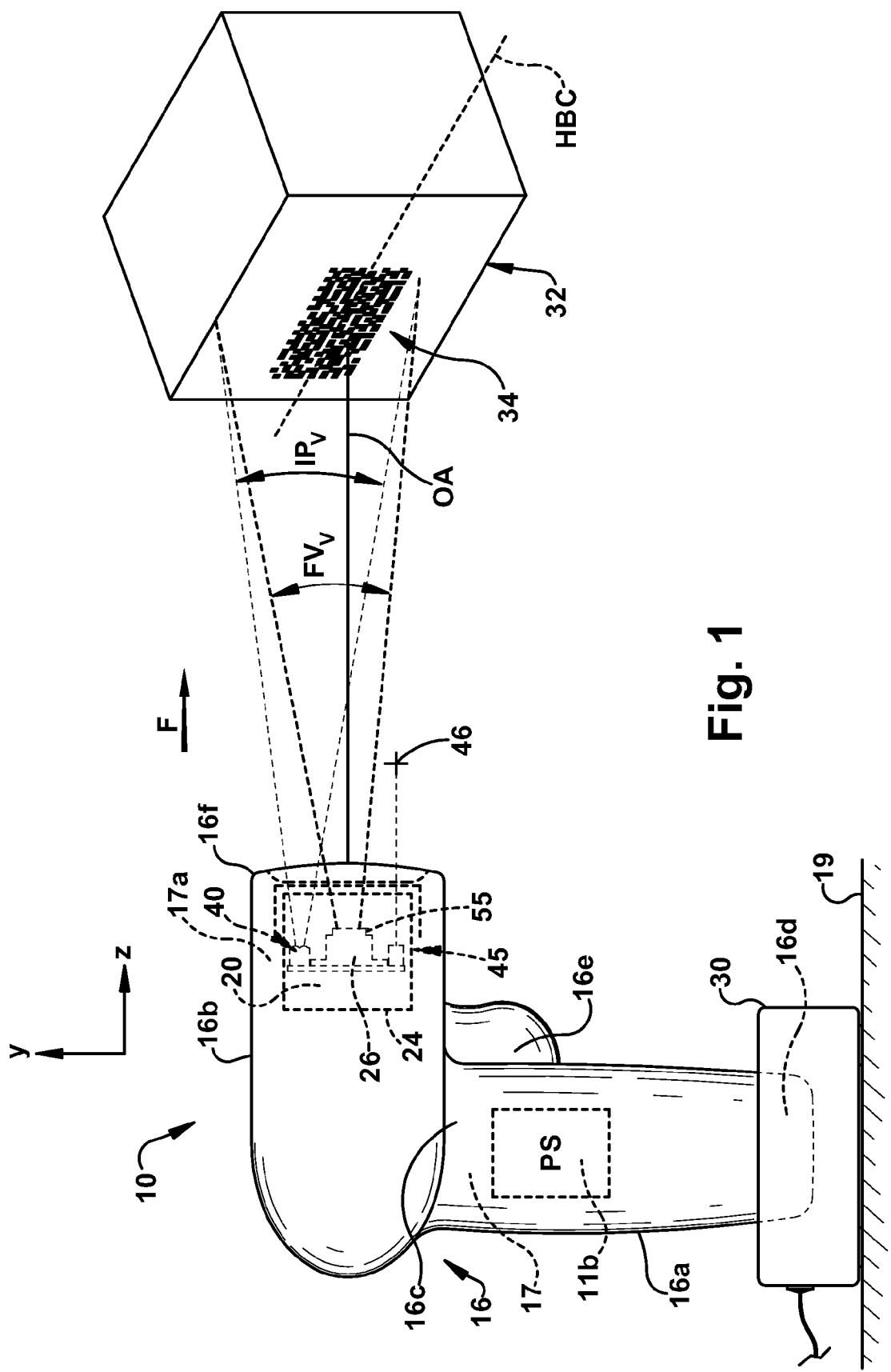
FIG. 1 is a schematic side elevation view of an exemplary embodiment of an imaging-based bar code reader of the present invention.
Figure 2:
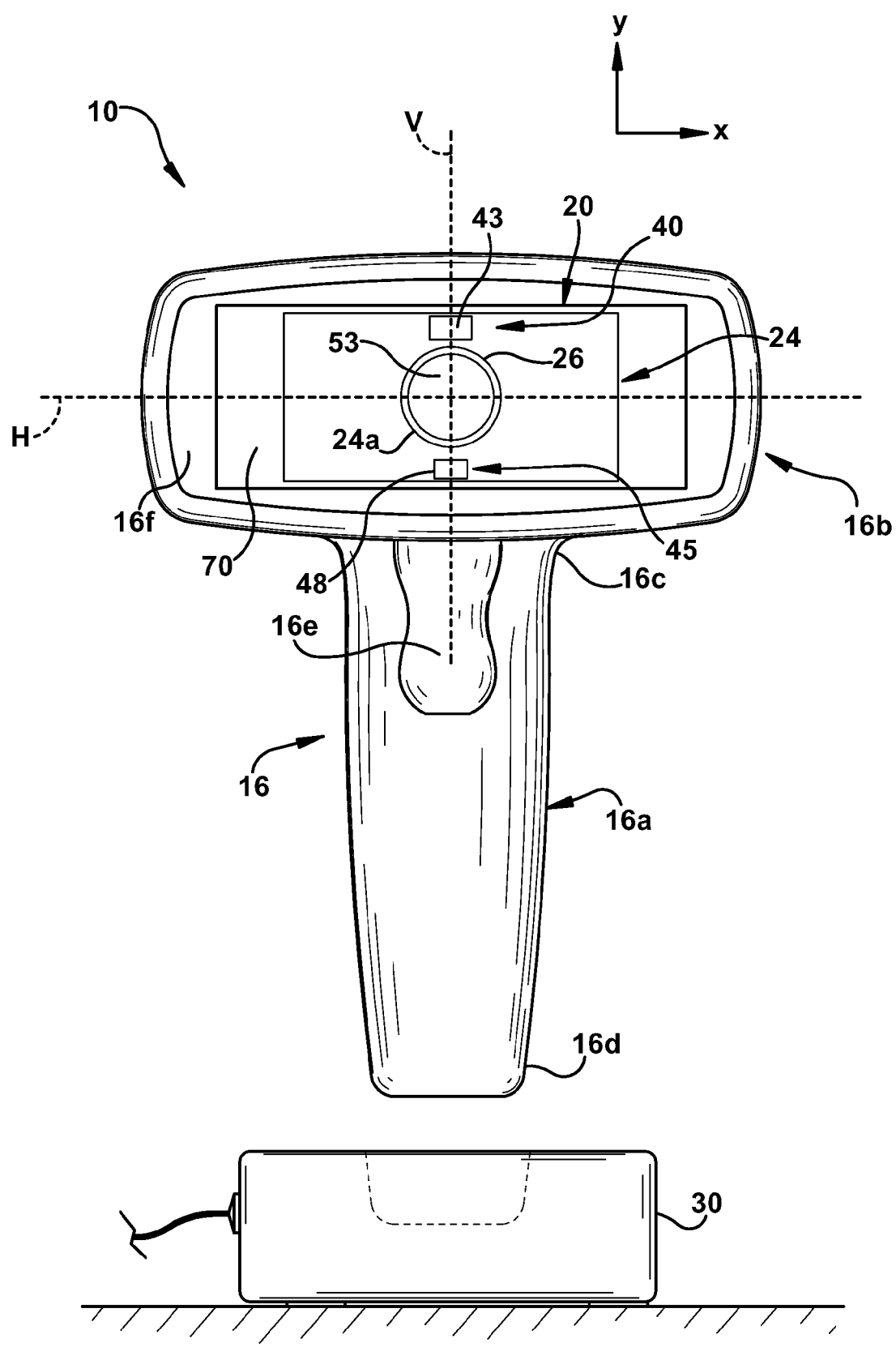
FIG. 2 is a schematic front elevation view of the bar code reader of FIG. 1.
Figure 3:
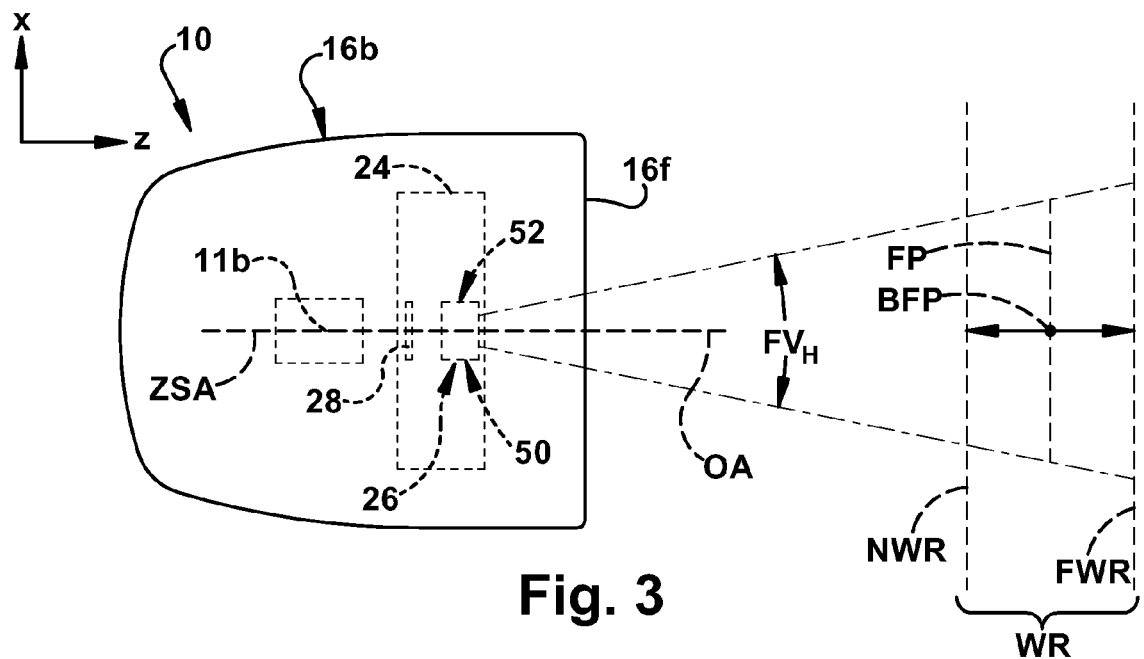
FIG. 3 is a schematic top plan view of the bar code reader of FIG. 1.

A first exemplary embodiment of an imaging-based bar code reader of the present invention is shown schematically at 10 in FIGS. 1-6. The bar code reader 10 includes an imaging system 12 embodied within a camera assembly 20 mounted in a housing 16. The imaging system 12 includes a decoder or decoding system 14 that may be integrated into the imaging system 12 or may be a separate system. The reader 10 is capable of reading, that is, imaging and decoding bar codes. The imaging system 12 is adapted to capture image frames of a field of view FV of the imaging system camera assembly 20 and the decoding system 14 is adapted to decode encoded indicia within a captured image frame. The housing 16 supports circuitry 11 of the reader 10 including the imaging and decoding systems 12, 14 within an interior region 17 of the housing 16.

The imaging camera assembly 20 and associated imaging circuitry 22 may be modular, that is, disposed within a housing 24 that may be removed or inserted as a unit into the reader 10, allowing the ready substitution of camera assemblies having different imaging characteristics, e.g., camera assemblies having different working ranges and different fields of view. A working range WR is a distance range in front of or forward (in a direction F in FIG. 1) of the camera assembly 20 within which a target object, such as a target bar code 34, may be successfully imaged and decoded. An end or limit of the working range WR closest to the camera assembly 20 will be referred to as the near working range NWR and end or limit of the working range WR furthest from the camera assembly 20 will be referred to as the far working range FWR. A field of view FV represents horizontal and vertical extents of imaging capability of the camera assembly 20.

Figure 4:
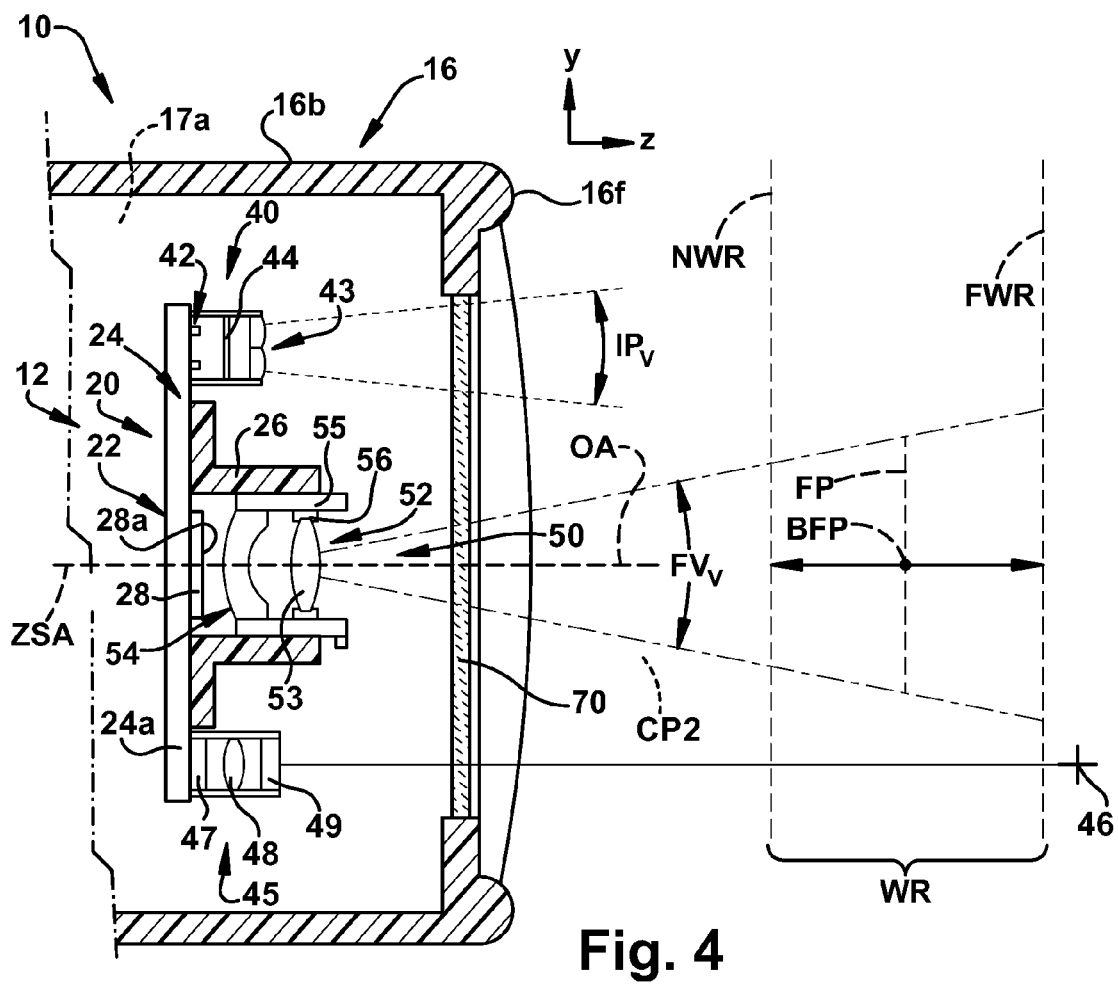
FIG. 4 is a schematic view partly in section and partly in side elevation of a camera assembly of an imaging assembly of the bar code reader of FIG. 1.
Figure 6:
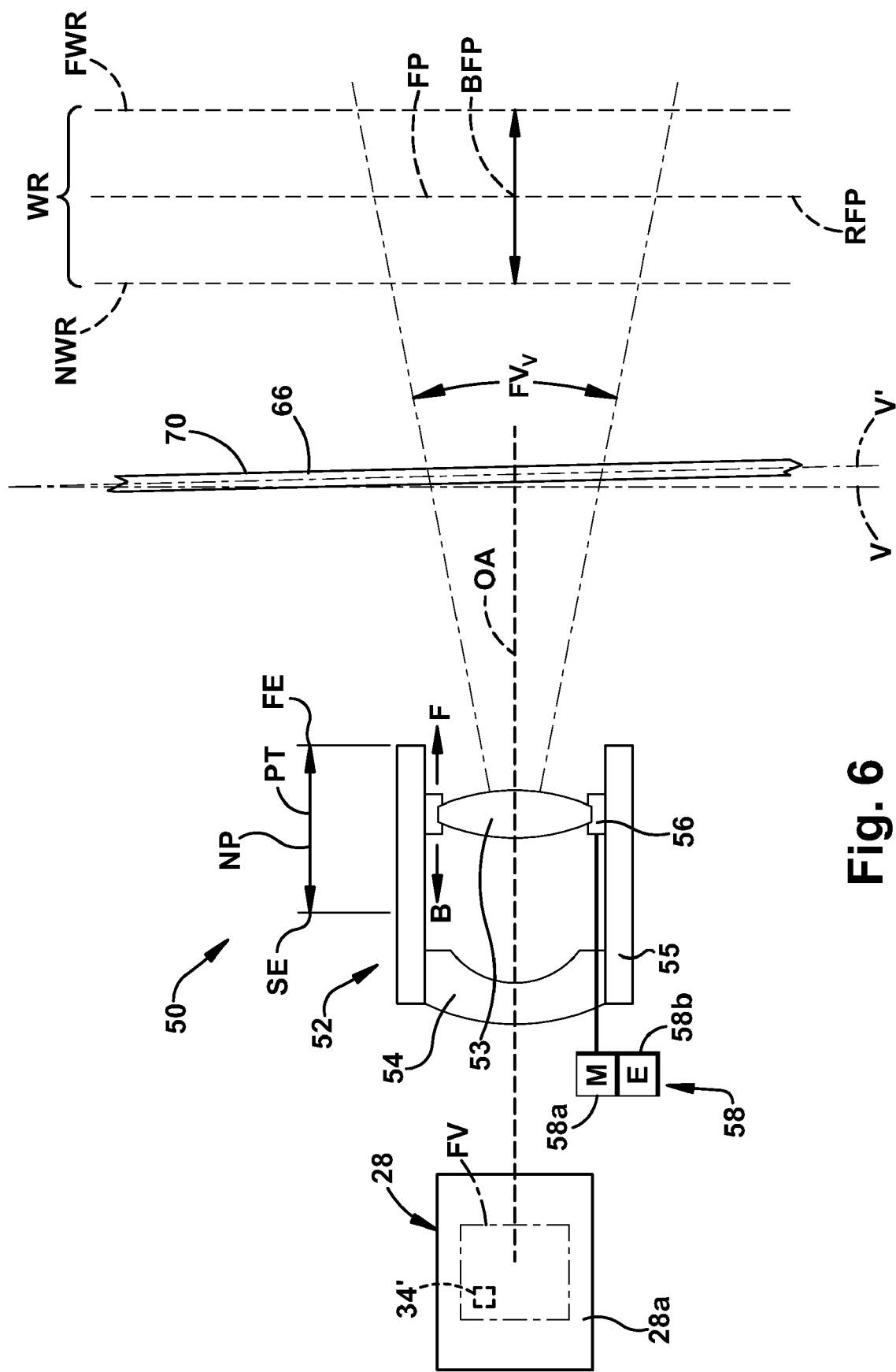
FIG. 6 is a schematic side elevation view of an exemplary embodiment of a variable focus imaging lens system of the present invention.

Supported within the housing 24 of the imaging camera assembly 20 are a sensor array 28 and a variable focus imaging lens assembly or system 50. The variable focus imaging lens assembly 50 includes an imaging lens assembly 52 having one or more imaging lens, which define an optical axis OA and focus illumination from the field of view FV onto a light receiving surface 28a the sensor array 28 (FIGS. 4 and 6). In the reader 10 of the present invention, at least one lens 53 of the imaging lens assembly 52 is a movable lens that is moved along a path of travel PT under the control of an automatic focusing system 60. Advantageously, the ability to move the lens 53 along the path of travel PT provides for decreasing image blurriness at the near and far limits of the working range WR of the camera assembly 20.

The lens assembly 52 is typically configured such that if the movable lens 53 is at a first end FE of its path of travel PT, the focusing of the lens assembly 52 onto the sensor array 28 is such that a best focus or in-focus position (shown schematically as BFP in FIG. 6) substantially corresponds to the far working range FWR of the imaging system 12 along the optical axis OA of the lens assembly 52. By best focus position BFP, it is meant that a target object 34 positioned within the field of view FV, along the optical axis OA at the best focus position BFP, the result would be an in-focus, sharp, high resolution image 34' (schematically shown in FIG. 5) of the target object 34 being focuses onto the light receiving surface 28a of the sensor array 28.

Stated another way, as can best be seen in FIG. 6, the best focus position BFP can be viewed as a focal plane BFP, orthogonal to the optical axis OA of the lens assembly 52, at a distance from the lens assembly 52 when measured along the optical axis OA at the best focus position BFP. A target object 34 positioned along a focal plane FP, which includes the best focus position BFP, would have an in-focus, high resolution image 34' of the target object 34 focus on the sensor array light receiving surface 28a.

As the movable lens 53 moves along the path of travel PT from the first end FE toward the second or opposite end SE of the path of travel PT, the best focus position BFP correspondingly moves from the far working range FWR toward the near working range NWR, as is shown. When the movable lens 53 is at the second end SE of the path of travel PT, the best focus position BFP substantially corresponds to the near working range NWR.

The lens assembly 52 is supported by a pair of lens holders 55, 56. The stationary lens 54 is supported by the lens holder 55 which is stationary with respect to the sensor array 28. The stationary lens 54 may be a flat piece of plastic or glass that has a zero optical power. The moving lens 53 is supported by the lens holder 56. In one exemplary embodiment, the moving lens holder 56 is movably supported within the stationary lens holder 55 and moves forward F and backward B along the optical axis OA with respect to the stationary lens holder 55. Thus, when the moving lens holder 56 slides or telescopes within the stationary lens holder 55, the moving lens 53 moves along its path of travel PT. The camera housing 24 defines a shroud 26 that supports and seals against the stationary lens holder 55 so that the only light incident upon the sensor array 28 is illumination passing through the lens assembly 52. The lens holders 55, 56 are typically made of metal or plastic material. Other possibilities for supporting the moving lens would be apparent to one of skill in the art.

The moving lens 53 is moved along the path of travel PT under the control of the automatic focusing system 60 by a drive mechanism 58. The drive mechanism 58 includes a motor 58a, such as a servo motor, to accurately drive the moving lens holder 56 such that the moving lens 53 moves along its path of travel PT and a position encoder 58b to accurately read out the position of the lens 53 as it moves along its path of travel PT.

The sensor array 28 is enabled during an exposure period to capture an image 34' of the target object, such as the target bar code 34, within the field of view FV of the imaging system 12. The field of view FV of the imaging system 12 is a function of both the configuration of the sensor array 28 and the lens assembly 52 and the distance and orientation between the array 28 and the lens assembly 52.

Figure 5:
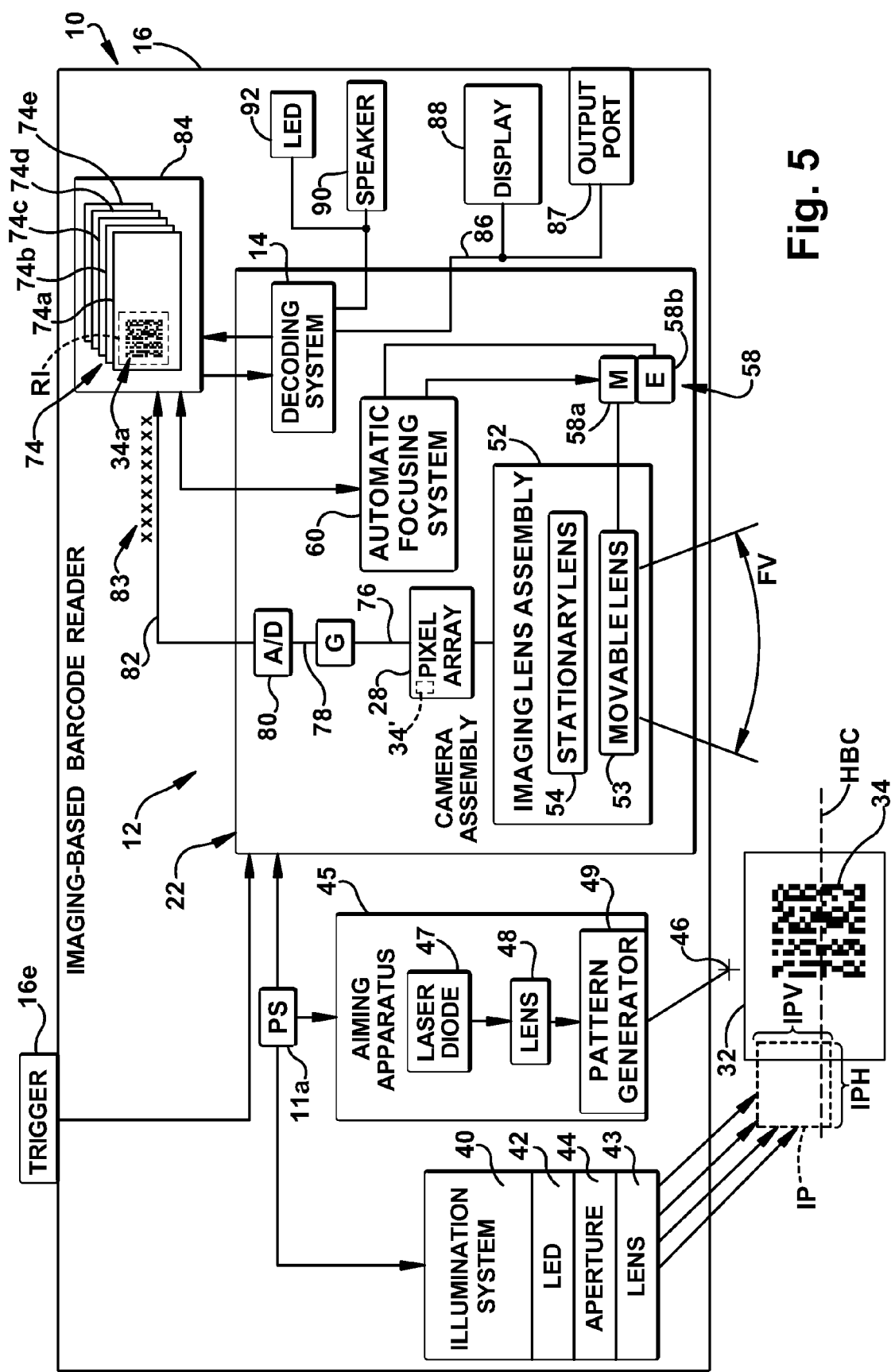
FIG. 5 is a schematic block diagram of the bar code reader of FIG. 1.

In one exemplary embodiment, the imaging system 12 is a two dimensional (2D) imaging system and the sensor array 28 is a 2D sensor array. The imaging system 12 field of view FV (shown schematically in FIG. 5) includes both a horizontal and a vertical field of view, the horizontal field of view being shown schematically as FVH in FIG. 3 and the vertical field of view being shown schematically as FVV in FIGS. 1 and 4. The sensor array 28 is primarily adapted to image 1D and 2D bar codes, for example, a Data Matrix bar code as schematically shown in FIGS. 1 and 5 which extends along a horizontal axis HBC and includes multiple rows of indicia comprising a multi-row, multi-column array of dark bars and white spaces. However, one of skill in the art would recognize that the present invention is also applicable to image postal codes, signatures, etc.

The housing 16 includes a gripping portion 16a adapted to be grasped by an operator's hand and a forward or scanning head portion 16b extending from an upper part 16c of the gripping portion 16a. A lower part 16d of the gripping portion 16a is adapted to be received in a docking station 30 positioned on a substrate 19 such as a table or sales counter. The scanning head 16b supports the imaging system 12 within an interior region 17a (FIG. 4) of the scanning head 16b. As can best be seen in FIG. 2, looking from the front of the housing 16, the scanning head 16b is generally rectangular in shape and defines a horizontal axis H and a vertical axis V. The vertical axis V being aligned with a general extent of the gripping portion 16a.

Advantageously, the reader 10 of the present invention is adapted to be used in both a hand-held mode and a fixed position mode. In the fixed position mode, the housing 16 is received in the docking station 30 and the target bar code 34 affixed to an object 32 (FIG. 1) is brought within the field of view FV of the reader's imaging system 12 in order to have the reader 10 read, that is, image and decode, the target bar code 34. The imaging system 12 is typically always on or operational in the fixed position mode to image and decode any target bar code presented to the reader 10 within the field of view FV. The docking station 30 is plugged into an AC power source and provides regulated DC power to circuitry 11 of the reader 10. Thus, when the reader 10 is in the docking station 30 power is available to keep the imaging system 12 on continuously.

In the hand-held mode, the housing 16 is removed from the docking station 30 so the reader 10 can be carried by an operator or user and positioned such that the target bar code 34 is within the field of view FV of the imaging system 12. In the hand-held mode, imaging and decoding of the target bar code 34 is instituted by the operator depressing a trigger 16e extending through an opening near the upper part 16c of the gripping portion 16a.

The imaging system 12, including the decoder 14, is part of the bar code reader circuitry 11. When removed from the docking station 30, power is supplied to the imaging and decoding systems 12, 14 by a power supply 11a. The imaging and decoding systems 12, 14 of the present invention may be embodied in hardware, software, electrical circuitry, firmware embedded within a separate microprocessor or within the modular camera assembly 20, on flash read only memory (ROM), on an application specific integrated circuit (ASIC), or any combination thereof.

Illumination Apparatus 40 and Aiming System 45

The bar code reader 10 includes an illumination apparatus or system 40 to illuminate the field of view FV, including the target bar code 34, and a laser aiming system 45 which generates a visible crosshair aiming pattern 46 (FIGS. 1, 4 and 5) to aid the operator in aiming the reader 10 at the target bar code 34 when using the reader 10 in the hand-held mode.

The aiming system 45 generates the visible aiming pattern 46 comprising, as an example, a dot or a crosshair pattern of illumination. The aiming system 45 typically includes a laser diode 47, a focusing lens 48 and a pattern generator 49 for generating the desired aiming pattern 46. The aiming pattern 46 is disabled when the imaging system 12 images the target bar code 34 to avoid have the aiming pattern appear in the captured image frames 74 and compromise the quality of the imaged target bar code 34a.

The illumination apparatus 40 may include one or more illumination sources 42 (FIGS. 4 and 5) such as surface mount LEDs (or a cold cathode lamp (CFL) which is energized to direct illumination though a focusing lens 43 and generate an illumination pattern IP (shown schematically in FIG. 5) that fills or substantially coincides with the field of view FV of the imaging system 12. An aperture 44 defining an opening is positioned between the LED 42 and a focusing lens 43. The aperture 44 limits the light or illumination from the LED focused onto the focusing lens 43. The focusing lens 43 images or projects the general shape of the aperture 44 toward the target object 32 thus defining the illumination pattern IP. The aperture 44 is in proximity to a focal plane of the focusing lens 43. The light from the aperture opening is collected and focused by the focusing lens 43.

The horizontal and vertical size or dimensions of the aperture 44 determine the horizontal and vertical extents (IPH & IPV shown schematically in FIG. 5) of the illumination pattern IP projected on the target object 32. While the illumination assembly 40 shown in the exemplary embodiment of the reader 10 includes a pair of illumination sources 42, an aperture 44 and a focusing lens 43, it should be understood that depending on the specifics of the reader and the environmental conditions under which the reader will be used, an illumination assembly 40 may be utilized having a single illumination source, such as an LED, without an aperture or a focusing lens.

The imaging circuitry 22 may be disposed within, partially within, or external to the camera assembly housing 24. A back end of the housing 24 may be comprised of a printed circuit board 24a, which forms part of the imaging circuitry 22 and extends vertically to also support the illumination source 42 (best seen in FIG. 4).

The camera housing 24 is supported within the scanning head interior region 17a in proximity to a transparent window 70 (FIG. 4) defining a portion of a front wall 16f of the scanning head 16b. The window 70 is oriented such that its horizontal axis is substantially parallel to the scanning head horizontal axis H. The vertical axis of the window 70 may be vertical or canted slightly (as shown in FIG. 6) from the vertical axis V to avoid specula reflection.

Sensor Array 28

The imaging system 12 includes the sensor array 28 of the imaging camera assembly 20. The sensor array 28 comprises a charged coupled device (CCD), a complementary metal oxide semiconductor (CMOS), or other imaging pixel array, operating under the control of the imaging circuitry 22. In one exemplary embodiment, the sensor array 28 comprises a two dimensional (2D) mega pixel CMOS array with a typical size of the pixel array being on the order of 1280×1024 pixels. Each pixel is comprised of a photosensitive element or photosensor that receives light and stores a charge proportional to the intensity of the light received and then is periodically discharged to generate an electrical signal whose magnitude is representative of the charge on the photosensitive element during an exposure period.

The illumination-receiving pixels of the sensor array 28 define the light receiving sensor array surface 28a (best seen in FIG. 4). The sensor array 28 is secured to the printed circuit board 24a, in parallel direction for stability. The sensor array surface 28a is substantially perpendicular to the optical axis OA of the lens assembly 52, that is, a z axis (labeled ZSA in FIG. 4) that is perpendicular to the sensor array surface 28a would be substantially parallel to the optical axis OA of the lens assembly 52. The pixels of the sensor array surface 28a are disposed substantially parallel to the horizontal axis H of the scanning head 16b.

As is best seen in FIG. 4, the lens assembly 52 focuses light reflected and scattered from the target bar code 34 onto the sensor array light receiving surface 28a. Thus, the lens assembly 52 focuses an image 34' (schematically shown in FIGS. 5 and 6) of the target bar code 34 (assuming it is within the field of view FV) onto the array of pixels comprising the light receiving surface 28a of the sensor array 28.

Operation of Imaging and Decoding Systems 12, 14

When actuated to read the target bar code 34, the imaging system 12 captures a series of image frames 74 (FIG. 5) which are stored in a memory 84. Each image frame 74 includes a gray scale digitized image 34a of the target bar code 34 (shown schematically in FIG. 5). The decoding system 14 decodes a digitized version of the image bar code 34a.

Electrical signals are generated by reading out of some or all of the pixels of the sensor array 28 after an exposure period. After the exposure time has elapsed, some or all of the pixels of sensor array 28 are successively read out thereby generating an analog signal 76 (FIG. 4). In some sensors, particularly CMOS sensors, all pixels of the sensor array 28 are not exposed at the same time, thus, reading out of some pixels may coincide in time with an exposure period for some other pixels.

The analog image signal 76 represents a sequence of photosensor voltage values, the magnitude of each value representing an intensity of the light received by a photosensor/pixel during an exposure period. The analog signal 76 is amplified by a gain factor, generating an amplified analog signal 78. The imaging circuitry 22 further includes an analog-to-digital (A/D) converter 80. The amplified analog signal 78 is digitized by the A/D converter 80 generating a raw, gray scale digitized signal 82. The digitized signal 82 comprises a sequence of digital gray scale values 83 typically ranging from 0-255 (for an eight bit processor, i.e., $2^8=256$), where a 0 gray scale value would represent an absence of any reflected light received by a pixel during an exposure or integration period (characterized as low pixel brightness) and a 255 gray scale value would represent a very high intensity of reflected light received by a pixel during an exposure period (characterized as high pixel brightness).

The digitized gray scale values 83 of the digitized signal 82 are stored in the memory 84. The digital values 83 corresponding to a read out of the sensor array 28 constitute an image frame 74a, which is representative of the image projected by the imaging lens assembly lens 50 onto the sensor array 28 during an exposure period. During an imaging session, as will be explained below, the automatic focusing system 60, will move the movable lens 53 along its path of travel PT while analyzing a series of captured image frames 74, including successive image frames 74a, 74b, 74c, etc.

If the field of view FV of the imaging lens assembly 50 includes the target bar code 34, then a digital gray scale value image 34a of the target bar code 34 would be present in the image frame, for example, the image frame 74a (as shown in FIG. 5).

As will be explained below, the decoding circuitry 14 operates on the digitized gray scale values 83 of a selected image frame, for example, image frame 74a and attempts to decode any decodable image within the image frame, e.g., the imaged target bar code 34a. If the decoding is successful, decoded data 86, representative of the data/information coded in the bar code 34 is then output via a data output port 87 and/or displayed to a user of the reader 10 via a display 88. Upon achieving a good "read" of the bar code 34, that is, the imaged bar code 34a was successfully imaged and decoded, a speaker 90 and/or an indicator LED 92 is activated by the imaging system 12 to indicate to the user that the target bar code 34 has successfully read, that is, the target bar code 34 has been successfully imaged and the imaged bar code 34a has been successfully decoded. If decoding is unsuccessful, another image frame, for example, image frame 74b, is selected and the decoding process is repeated until a successful decode is achieved.

Variable Focus Imaging Lens Assembly 50

As mentioned previous, within the field of view FV, there are objects at different depths or distances from the lens assembly 52, thus, different regions of the image of the field of view FV focused on the sensor array 28 will have differing degrees of blurriness. Accordingly, different regions of the captured image frames 74 will also exhibit differing degrees of blurriness.

The automatic focusing system 60 controls movement of the movable lens 53 of the lens assembly 52 via the drive mechanism 58. Obviously as the movable lens 53 moves along its path of travel, a resolution or sharpness of the image 34' of the target bar code 34 focused on the light receiving surface 28a of the sensor array 28 will change with the position of the movable lens 53. Also, the resolution or sharpness of the gray scale digitized image 34a of the target bar code 34 in the series of captured image frames 74 will also correspondingly change with the position of the movable lens 53.

In order to select the proper image focus, that is, to select a captured image frame, say image frame 74c, from the series of image frames 74 for decoding of the gray scale image 34a of the target bar code 34, the automatic focusing system 60 analyzes image quality in terms of the amount of blur in the captured image frame ("blur analysis").

However, this process of blur analysis of a series of image frames 74 is much more efficient if the automatic focusing system 60 can identify a region or portion of the series of the image frames for blur analysis that corresponds to the gray scale image 34a of the target bar code 34, instead of analyzing each image frame in its entirety. The automatic focusing system 60 of the present invention does this by utilizing an algorithm or search routine that identifies a region of interest RI in one or more an image frames where the imaged bar code 34a is found and then utilizes this region of interest RI in blur analysis of subsequent image frames.

Another situation where identifying a region of interest RI is desirable is where the object 32 to which the target bar code 34 is affixed does not occupy the entire field of view FV of the camera assembly 20. Background objects in the field of view FV may be at substantially greater distances than the object 32, the algorithm or search routine used by the automatic focusing system 60 must focus on the correct object in the image frame 74, that is, the object 32 that includes the bar code 34.

The variable focus imaging lens assembly or system 50 includes the lens assembly 50, the automatic focusing system 60 and the movable lens drive mechanism 58. Advantageously, the automatic focusing system 60 of the present invention provides for: 1) quick and accurate determination of a region of interest RI in one or more captured image frames, e.g., image frame 74a, the region of interest RI corresponding to a gray scale image 34a of a target bar code; 2) as the movable lens is driven along its path of travel, analysis of image blur in subsequent image frames, e.g., image frames 74b, 74c, . . . , within the region of interest RI to determine an amount of blurring in each image frame 74b, 74c, . . . ; and 3) selection of an image frame for attempted decoded wherein the amount of blurring in the image frame is less than a predetermined value. The idea being that once the imaged bar code 34a and, therefore, the region of interest RI is located for a specific image frame, it is likely that the image bar code 34a will appear is substantially the same position in subsequent image frames.

Figure 7:
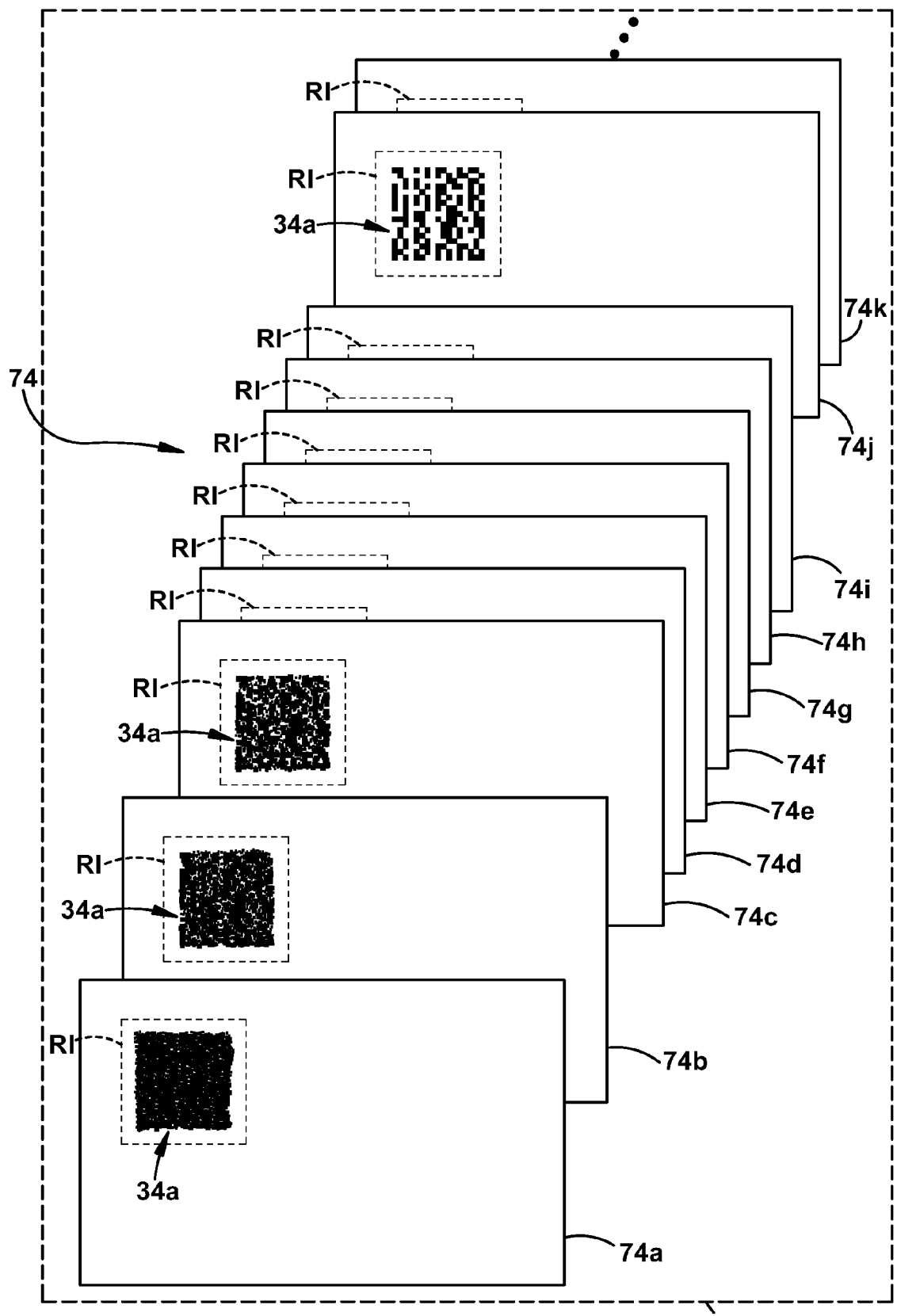
FIG. 7 is a schematic representation of a series of captured image frames stored in a memory of the imaging system, showing a region of interest which encompasses an image of a target bar code, the region of interest being identified and utilized by an automatic focusing system of the variable focus imaging lens assembly to efficiently identify a decodable version of the imaged target bar code from a series of captured image frames.
Figure 8:
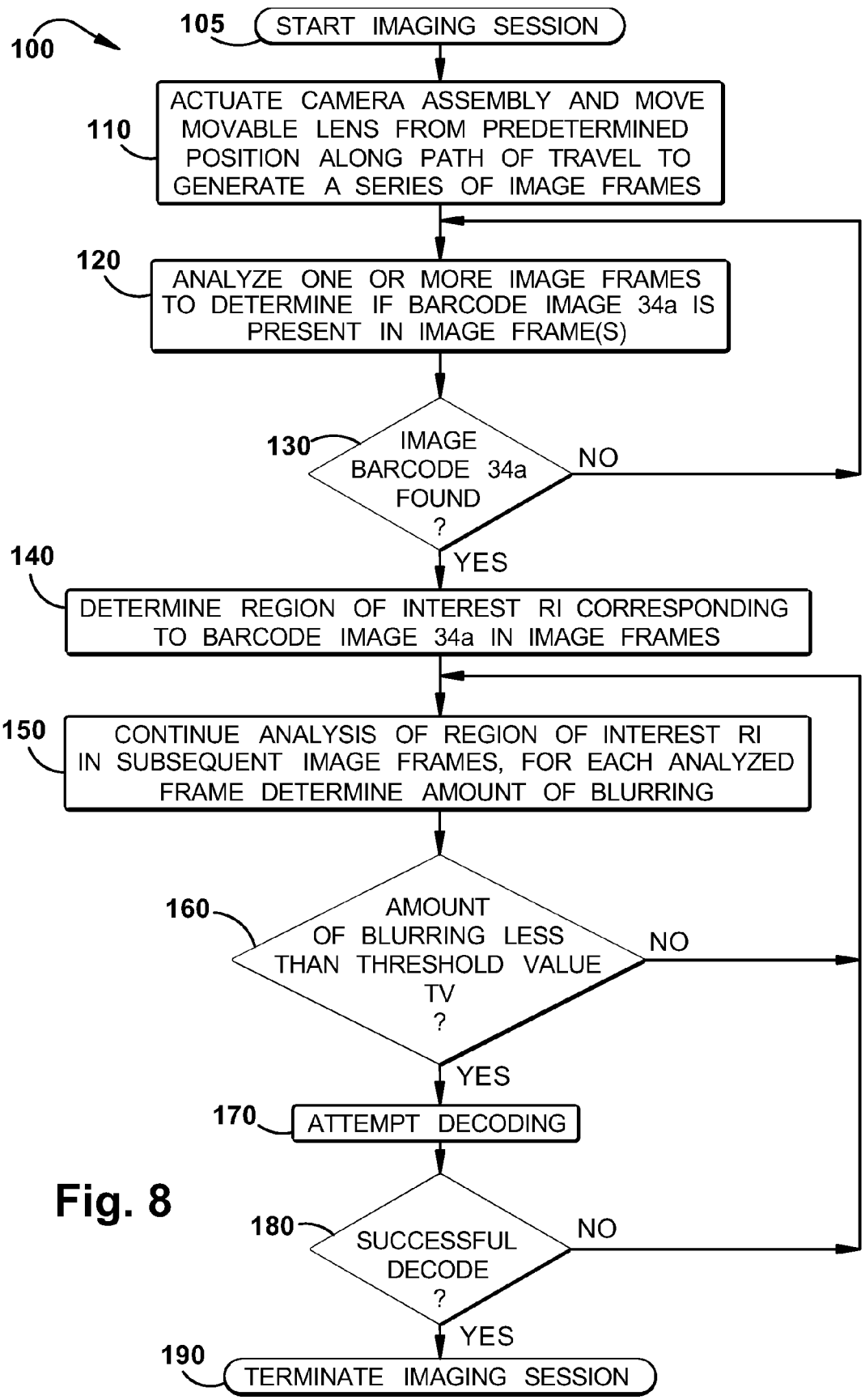
FIG. 8 is a schematic flow diagram of process employed by the automatic focusing system to identify the region of interest corresponding to a position or area where an imaged bar code is likely to be found and finding a decodable version of the imaged target bar code within the region of interest.

Turning to FIG. 7, a method or process utilized by the automatic focusing system 60 is presented schematically, generally at 100, in flow chart form. At step 100, an imaging session is commenced by either a user actuating the trigger 16e in a hand-held mode of use of the reader 10 or a target object 34 being brought within the field of view FV and the working range WR of the camera assembly 20 in a stationary or docking station mode of use of the reader 10. At step 110, the automatic focusing system 60 actuates the camera assembly 20 to generate a series of image frames 74 and the drive mechanism 58 is also actuated to move the movable lens 53 from a given, predetermined position along its path of travel. Typically, the predetermined lens position will be a lens position at the first end FE of the movable lens path of travel which corresponds to a best focus position BFP substantially at the far working range FWR of the imaging system camera assembly 20.

At step 120, the automatic focusing system 60 will analyze one or more captured image frames of the series of image frames 74, for example, image frame 74a, using the known statistical and/or autodiscrimination techniques to determine if there is a gray scale bar code image 34a in the captured image frame 74a. By way of example, and without limitation, two known statistical/autodiscrimination techniques for determining if a bar code image 34a exists in the captured image frame 74a include: 1) contrast analysis wherein regions of high contrast of the image frame 74a are searched for, the idea being that regions of high contrast may be the black bars or blocks on a contrasting white or light background that is characteristic of a 1D or 2D bar code; and 2) edge height and direction analysis wherein black or dark edges are searched for in the captured image frame 74a with the idea that a transition or edge is representative of the edge of a black bar in a 1D or 2D bar code. For example, if there are many strong edges in a primary direction, then it is likely a bar code. If there are two strong directions, then it is likely a 2D bar code.

Those of skill in the art would recognize that there are many techniques that used either alone or in combination that allow the identification of a gray scale image 34a of a target bar code 34 in a captured image frame 74a and it is the intent of the present invention to cover all such techniques. The following patents, all assigned to the assignee of the present invention, disclose various statistical/autodiscrimination useful in identification of bar code images in captured image frames: U.S. Pat. No. 6,405,925 to He et al., issued Jun. 18, 2002; U.S. Pat. No. 6,340,114 to Correa et al., issued Jan. 22, 2002; and U.S. Pat. No. 6,340,119 to He et al., issued Jan. 22, 2002. The aforesaid '925, '114, and 119 patents are incorporated herein in their respective entireties by reference.

At step 130, a determination is made if an imaged gray scale bar code 34a has been found in the one or more captured image frames that have been analyzed, say image frame 74a. If, at step 130, an imaged bar code 34a is identified, then, at step 140, a region of interest RI substantially corresponding to or encompassing the imaged bar code 34a is identified and saved by the automatic focusing system 60. If, at step 130, no imaged bar code can be identified in any of the series of captured image frames 74, then, the process returns to step 120 wherein the automatic focusing system 60 analyzes subsequent image frames, for example, captured image frames 74b, 74c, 74d, etc., in the series of image frames 74 until such time as imaged bar code 34a is found and a region of interest RI can be identified or until the imaging session is either terminated by the user by, for example, releasing the trigger 16e or a time out circuit in the reader terminates the imaging session.

It should be recognized that the identification of the region of interest RI may result from a combination of analyzing two or more captured image frames, for example, image frame 74a may provide some inkling, but not confirmation, of a region of interest RI in the form of a "blob" of gray pixels generally forming a rectangle and, as additional image frames 74b, 74c, etc., as focus of the imaging lens assembly 53 is changed, edges of the imaged bar code 34a are gradually identified leading to confirmation of the imaged bar code 34a and identification of the region of interest RI. This situation is schematically shown in FIG. 7 wherein image frame 74a has a contrasting "blob" or area of gray pixels on a white background. The contrasting "blob" area is not in-focus and, therefore, it is indefinite to the automatic focusing system 60 as to whether or not an imaged bar code 34a is present in image frame 74a and, further, if the "blob" area is an imaged bar code, what are the outer bounds or perimeter of any such bar code 34a so that a region of interest RI may be established.

In subsequent image frames 74b, 74c, it can be seen that the imaged bar code 34a becomes more clear (because of the movement of the movable lens 63 along its path of travel PT). Thus, applying the techniques of contrast, edge detection and height detection to image frames 74b, 74c will permit the automatic focusing system 60 to confirm the presence of the imaged bar code 34a, determine the outer periphery of the imaged bar code and identify a region of interest RI that encompasses the outer peripherally of the image bar code 34a. As shown schematically in FIG. 7, the region of interest RI may somewhat larger than the outer periphery of the imaged bar code 34a to provide a margin for error when attempting to identify the bounds or periphery of the imaged bar code and to allow for some movement of the target bar code 34 horizontally or vertically within the field of view FV during the imaging session. For example, the user may move the reader 10 slightly during the imaging session in attempting to align the aiming pattern 45 with the target bar code 34.

Once the region of interest RI is identified, then at step 150, the automatic focusing system 70 continues to analyze the region of interest RI in subsequent image frames in the series of image frames 74, for example, captured image frames 74e, 74f, 74g, etc. and performs blur analysis on those image frame regions of interest RI until an image frame is found, for example, image frame 74j, wherein an amount of blurring in the region of interest RI is below a predetermined threshold value of blurring TV. The threshold blurring value TV may be set, for example, empirically depending on the type and size of bar code sought to be decoded, the characteristics of the camera assembly, ambient lighting and environmental conditions, etc. such that a gray scale bar code image 34a having an amount of blurring less than the threshold value TV is very likely (say 80%) to be decodable by the decoder 14.

At step 160, if the amount of blur of the image frame is less than the threshold value TV, then the process moves to step 170. At step 170, the decoder 14 is activated and operates on the selected image frame 74j in an attempt to decode the gray scale image 34a of the bar code 34 in the selected image frame 74j.

At step 180, a determination is made if attempted decoding of the gray scale image 34a of image frame 74j has been successful. If decoding is successful, then at 190, the imaging session is terminated and the reader 10 provides signal(s) to the user via display 88, speaker 90, and/or LED 92, that the target bar code 34 has been successfully read.

If decoding is unsuccessful at step 180, then the process returns to step 150 and the automatic focusing system 60 continues to analyze the region of interest RI of successive image frames of the until another image frame, say image frame 74k, is found whose blur amount is less than the threshold blur amount TV and the process continues until either a successful decoding is accomplished or the imaging session is terminated by the user releasing the trigger 16e or by a time out default built into the imaging system 12.

Figure 9:
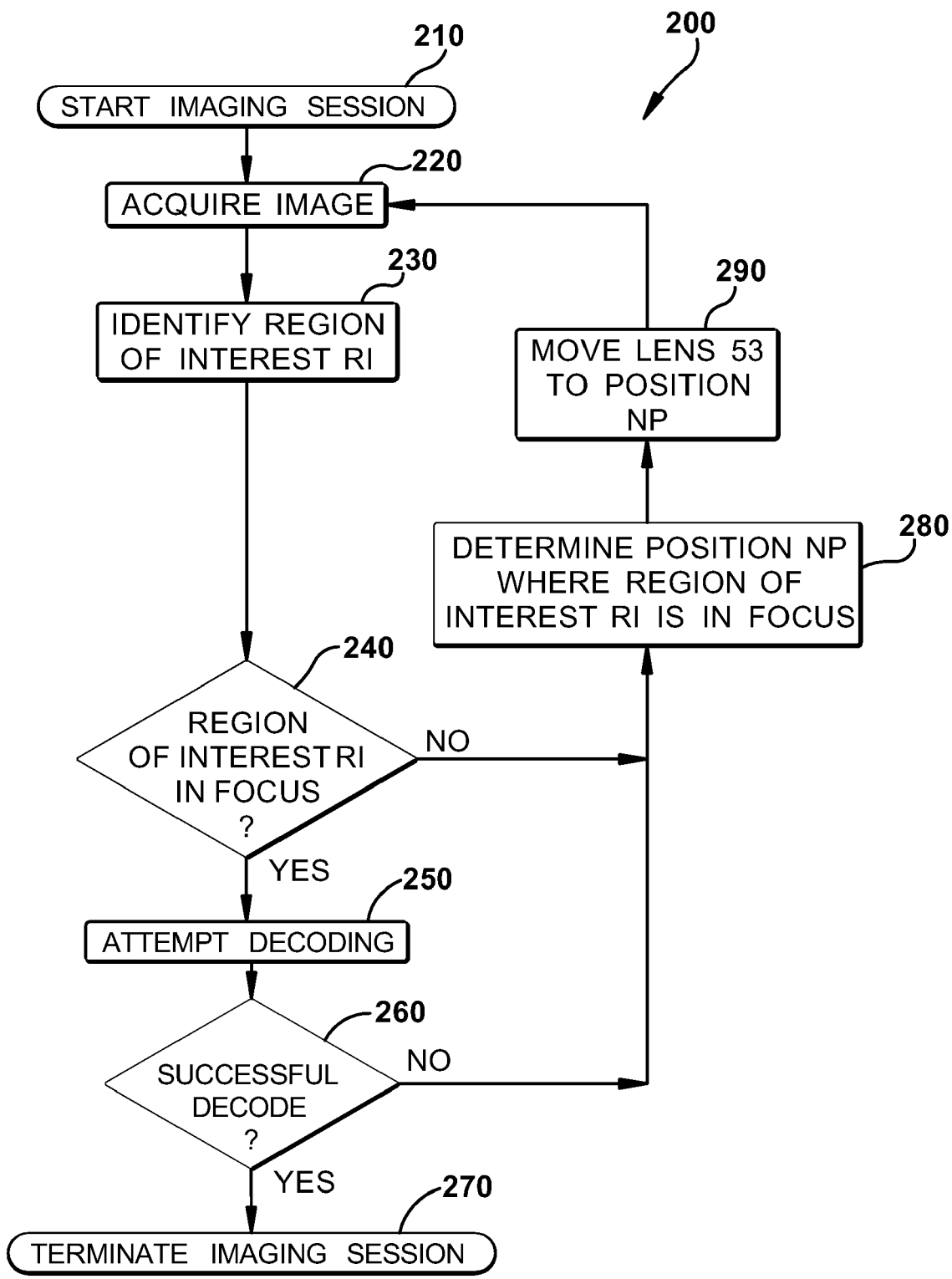
FIG. 9 is a schematic flow diagram of an alternate embodiment of a process employed by the automatic focusing system to identify the region of interest corresponding to a position or area where an imaged bar code is likely to be found and finding a decodable version of the imaged target bar code within the region of interest.

An alternate embodiment of the process utilized by the automatic focusing system 60 of the present invention is shown schematically in flow chart form at 200 in FIG. 9. Turning to FIG. 9, at step 210, an imaging session is commenced by activation of the camera assembly 20.

At step 220, with the movable lens 53 in its stationary, predetermined position FE, an image frame, say image frame 74a, is acquired, that is, the image frame 74a is generated by the camera assembly 20 and analyzed by the automatic focusing system 60. At step 230, the automatic focusing system 60 attempts to identify a region of interest RI in the acquired image frame 74a corresponding to the position of the target bar code image 34a. At step 240, if a region of interest has been identified, using blur analysis, a determination is made if the identified region interest RI is in-focus, that is, is the blur amount below a predetermined threshold value? If the region of interest RI is in-focus, then at step 250, the automatic focusing system 60 focuses on the region of interest RI and the decoder 14 is activated to attempt a decode of the imaged target bar code 34a.

At step 260, at determination is made if the target bar code image 34a was successfully decoded. If the decoding was successful, then at step 270, the imaging session is terminated.

If at step 240, it is determined using blur analysis that the region of interest RI is not in-focus, then, at step 280, the automatic focusing system 60 utilizes the results of the blur analysis and/or an algorithm or a heuristic based on prior empirical results with the movable lens 53 to determine a new position NP (FIGS. 6 and 9) along the movable lens path of travel PT wherein the region of interest RI in a captured image frame would be expected to be more in-focus. At step 290, the movable lens 53 is moved along its path of travel PT to the new position NP.

The process then reverts to step 220 wherein an image frame, say image frame 74j, is acquired and analyzed to see if a region of interest RI can be identified, as described above.

If at step 260, it is determined that the imaged target bar code 34a was not successfully decoded, then the process reverts to steps 280 and 290 wherein a new position NP is determined and the movable lens 53 is moved along its path of travel to the new position NP, and new image frame is acquired and analyzed, as described above.

While the present invention has been described with a degree of particularity, it is the intent that the invention includes all modifications and alterations from the disclosed design falling with the spirit or scope of the appended claims.

I claim:

1. A variable focus imaging lens assembly for an imaging system of an imaging-based bar code reader for imaging and decoding a target bar code, the imaging system generating image frames of a field of view of the imaging system and including an imaging sensor array and a decoder for decoding an image of the target bar code, the variable focus imaging lens assembly comprising:
    a lens assembly focusing light from the field of view onto the sensor array, the lens assembly including a lens movable along a path of travel;
    a drive mechanism driving the movable lens from a predetermined position along the path of travel;
    an automatic focusing system:
        energizing the drive mechanism and imaging system to move the movable lens from the predetermined position along its path of travel and generate a series of image frames;
        analyzing one or more image frames in a portion of the series of image frames to identify a region of interest by locating an image of a target bar code in the one or more analyzed image frames;
        estimating an amount of blurring in each of at least two subsequent image frames in a subsequent portion of the series of image frames within the identified region of interest of the one of more analyzed image frames, wherein the at least two of the subsequent image frames have two different focus planes, each focus plane corresponding to a different position along the path of travel of the movable lens in the lens assembly;
        selecting an image frame from the subsequent image frames of the series of image frames if the estimated amount of blurting in the identified region of interest in an image frame is less than a predetermined threshold; and
        utilizing the decoder to decode the image of the target bar code in the selected image frame.

2. The variable focus imaging lens assembly of claim 1 wherein the movable lens path of travel is coincident with an optical axis of the lens assembly.

3. The variable focus imaging lens assembly of claim 1 wherein the predetermined position of the movable lens corresponds to a best focus position of the imaging system at a far working range of the imaging system.

4. The variable focus imaging lens assembly of claim 1 wherein the movable lens is moved along a path of travel corresponding to moving a best focus position of the imaging system from a far working range to a near working range of the imaging system.

5. The variable focus imaging lens assembly of claim 1 wherein determination of the region of interest includes contrast and edge detection analysis.

6. An imaging-based bar code reader for imaging and decoding a target bar code, the bar code reader comprising:
    an imaging system generating image frames of a field of view of the imaging system and including an imaging sensor array and a decoder; and
    a variable focus imaging lens assembly for focusing light from the field of view onto the sensor array, the variable focus imaging lens assembly including:
    a lens assembly focusing light from the field of view onto the sensor array, the lens assembly including a lens movable along a path of travel;
    a drive mechanism driving the movable lens along the path of travel;
    an automatic focusing system:
    energizing the drive mechanism and imaging system to move the movable lens from a predetermined position along a path of travel of the movable lens and generate a series of mage frames, wherein the predetermined position is determined prior to the movable lens is in that position;
    analyzing one or more image frames in a portion of the series of image frames to identify a region of interest by locating an image of a target bar code in the one or more analyzed image frames;
    estimating an amount of blurring in each of at least two subsequent image frames in a subsequent portion of the series of image frames within the identified region of interest of the one of more analyzed image frames, wherein the at least two of the subsequent image frames have two different focus planes, each focus plane corresponding to a different position along the path of travel of the movable lens in the lens assembly;
    selecting an image frame from the subsequent image frames of the series of image frames if the estimated amount of blurring in the identified region of interest in an image frame is less than a predetermined threshold; and
    utilizing the decoder to decode the image of the target bar code in the selected image frame.

7. The bar code reader of claim 6 wherein the movable lens path of travel is coincident with an optical axis of the lens assembly.

8. The bar code reader of claim 6 wherein the predetermined position of the movable lens corresponds to a best focus position of the imaging system at a far working range of the imaging system.

9. The bar code reader of claim 6 wherein the movable lens is moved along a path a travel corresponding to moving a best focus position of the imaging system from a far working range to a near working range of the imaging system.

10. The bar code reader of claim 6 wherein determination of the region of interest includes contrast and edge detection analysis.

11. A method of imaging and decoding a target bar code reading, the steps of the method comprising:
    providing an imaging system generating image frames of a field of view of the imaging system and including an imaging sensor array and a decoder, a variable focus imaging lens assembly for focusing light from the field of view onto the sensor array, the variable focus imaging lens assembly including a lens assembly focusing light from the field of view onto the sensor array, the lens assembly including a lens movable along a path of travel, a drive mechanism driving the movable lens along the path of travel, and an automatic focusing system:

energizing the drive mechanism and imaging system to move the movable lens from the predetermined position along its path of travel and generate a series of image frames;

analyzing one or more image frames in a portion of the series of image frames to identify a region of interest by locating an image of a target bar code in the one or more analyzed image frames;

estimating an amount of blurring in each of at least two subsequent image frames in a subsequent portion of the series of image frames within the identified region of interest of the one or more analyzed image frames, wherein at the least two of the subsequent image frames have two different focus planes, each focus plane corresponding to a different position along the path of travel of the movable lens in the lens assembly;

selecting an image frame from the series of image frames if the estimated amount of blurring in the identified region of interest in an image frame is less than a predetermined threshold value; and utilizing the decoder to decode the image of the target bar code in the selected image frame.

12. The method of imaging and decoding a target bar code of claim 11 wherein the movable lens path of travel is coincident with an optical axis of the lens assembly.

13. The method of imaging and decoding a target bar code of claim 11 wherein the predetermined position of the movable lens corresponds to a best focus position of the imaging system at a far working range of the imaging system.

14. The method of imaging and decoding a target bar code of claim 11 wherein the movable lens is moved along a path a travel corresponding to moving a best focus position of the imaging system from a far working range to a near working range of the imaging system.

15. The method of imaging and decoding a target bar code of claim 11 wherein determination of the region of interest includes contrast and edge detection analysis.

16. A method of imaging and decoding a target bar code reading, the steps of the method comprising:

providing an imaging system generating image frames of a field of view of the imaging system and including an imaging sensor array and a decoder, a variable focus imaging lens assembly for focusing light from the field of view onto the sensor array, the variable focus imaging lens assembly including a lens assembly focusing light from the field of view onto the sensor array, the lens assembly including a movable lens movable along a path of travel, and an automatic focusing system:

energizing the imaging system to generate an image frame with the lens in a predetermined, stationary position;

analyzing the image frame to identify a region of interest by locating an image of a target bar code in the analyzed image frame;

analyzing the identified region of interest of the analyzed image frame to estimate an amount of blurring;

if the estimated amount of blurring in the identified region of interest in the analyzed image frame is less than a predetermined threshold value, utilizing the decoder to decode the image of the target bar code in the analyzed image frame; and if the estimated amount of blurring in the identified region of interest in the image frame is greater than or equal to the predetermined threshold value, determining a new position along the movable lens path of travel PT wherein the region of interest RI of the one of more analyzed image frames in a subsequently captured image frame would be more in-focus, and moving the movable lens to one or more new positions and generating one or more image frames until an amount of blurring within the identified region of interest of the analyzed image frame is less than the predetermined threshold value.

17. A variable focus imaging lens assembly for an imaging system of an imaging-based bar code reader for imaging and decoding a target bar code, the imaging system generating image frames of a field of view of the imaging system and including an imaging sensor array and a decoder for decoding an image of the target bar code, the variable focus imaging lens assembly comprising:

a lens assembly focusing light from the field of view onto the sensor array, the lens assembly providing for a best focus position that is movable between a far working range and a near working range of the imaging system;

an automatic focusing system:

energizing the imaging system and the lens assembly to move the best focus position of the lens assembly from a predetermined focus position between the near working range and the far working range and generate a series of image frames;

analyzing one or more image frames in a portion of the series of image frames to identify a region of interest by locating an image of a target bar code in the one or more analyzed image frames;

estimating an amount of blurring in each of at least two subsequent image frames in a subsequent portion of the series of image frames within the identified region of interest of the one or more analyzed image frames, wherein the at least two of the subsequent image frames have two different focus planes, each focus plane corresponding to a different position along the path of travel of the movable lens in the lens assembly;

selecting an image frame from the subsequent image frames of the series of image frames if the estimated amount of blurring in the identified region of interest in an image frame is less than a predetermined threshold; and utilizing the decoder to decode the image of the target bar code in the selected image frame.

18. The variable focus imaging lens assembly of claim 17 wherein the lens assembly includes a movable lens and the lens moves along a path of travel, one end of the path of travel corresponds a best focus position at a far working range of the imaging system and an opposite end of the path of travel corresponding to a best focus position at a near working range of the imaging system.

19. The variable focus imaging lens assembly of claim 17 wherein the predetermined focus position corresponds to the far working range of the imaging system.

20. The variable focus imaging lens assembly of claim 17 wherein determination of the region of interest includes contrast and edge detection analysis.

* * * * *

UNITED STATES PATENT AND TRADEMARK OFFICE
CERTIFICATE OF CORRECTION

PATENT NO. : 7,854,385 B2  
APPLICATION NO. : 11/931410  
DATED : December 21, 2010  
INVENTOR(S) : Carlson Page 1 of 1

It is certified that error appears in the above-identified patent and that said Letters Patent is hereby corrected as shown below:

IN THE SPECIFICATION

In Column 7, Line 37, delete "(or" and insert -- or --, therefor.

IN THE CLAIMS

In Column 13, Line 58, in Claim 1, delete "blurting" and insert -- blurring --, therefor.

In Column 14, Line 27, in Claim 6, delete "mage" and insert -- image --, therefor.

In Column 14, Line 55, in Claim 9, delete "path a travel" and insert -- path of a travel --, therefor.

In Column 15, Lines 38-39, in Claim 14, delete "path a travel" and insert -- path of a travel --, therefor.

Signed and Sealed this
Twenty-ninth Day of May, 2012

David J. Kappos
*Director of the United States Patent and Trademark Office*